United States Patent [19]
Barber

[11] Patent Number: 5,682,738
[45] Date of Patent: Nov. 4, 1997

[54] HEAT ENGINES AND WASTE DESTRUCTION MECHANISM

[76] Inventor: John S. Barber, 797 Sam Bass Rd., Round Rock, Tex. 78680

[21] Appl. No.: 397,847

[22] Filed: Mar. 2, 1995

[51] Int. Cl.$^6$ .................................................... F02G 3/00
[52] U.S. Cl. ............................ 60/39.63; 60/39.05
[58] Field of Search ........................ 60/39.63, 39.05

[56] References Cited

U.S. PATENT DOCUMENTS

| | | | |
|---|---|---|---|
| 1,302,582 | 5/1919 | Norman | 60/39.63 |
| 3,839,858 | 10/1974 | Avermaete | 60/39.63 |
| 4,100,730 | 7/1978 | Pradt . | |
| 4,191,012 | 3/1980 | Stoddard et al. | 60/39.05 |
| 4,212,163 | 7/1980 | Mikina | 60/39.63 |
| 4,336,686 | 6/1982 | Porter . | |
| 4,338,199 | 7/1982 | Modell . | |
| 4,543,190 | 9/1985 | Modell . | |
| 4,822,497 | 4/1989 | Hong et al. . | |
| 4,861,497 | 8/1989 | Welch et al. . | |
| 4,864,814 | 9/1989 | Albert . | |
| 4,898,107 | 2/1990 | Dickinson . | |
| 5,147,564 | 9/1992 | Titmas . | |

*Primary Examiner*—Michael Koczo
*Attorney, Agent, or Firm*—Paul M. Denk

[57] ABSTRACT

A heat engine for the disposal of organic wastes and method of using the same. The invention includes structure for mixing the organic wastes, a substantially isentropic compression device, a substantially isentropic expansion device, fluid conduit between the compression and expansion device, a substantially isobaric heating device and a substantially isothermic heat rejection device.

20 Claims, 6 Drawing Sheets

HEAT ENGINES AND WASTE DESTRUCTION MECHANISM

BACKGROUND OF THE INVENTION

This invention relates generally to improvements in wet oxidation methods of water borne waste destruction and in particular to a method of recovering energy generated from the process. Improvements include low cost means of compression of gaseous oxidants, low erosion, pressure letdown system, low cost high temperature reactor and creation of shaft power from waste energy. The components of this invention are themselves unique and combined provide superior performance to means of waste destruction developed to date.

Waste treatment companies around the world are confronting decreasing waste disposal options and accompanying rising costs. Sludge ocean dumping in the United States was eliminated in 1988 thus eliminating a major source of disposal for coastal U.S. cities. Land filling, land farming and incineration is receiving greater scrutiny due to regulations and public sentiment to reduce pollution such as pathogens, heavy metal and methane gas. The disappearance of available land fill sites and the tightening of disposal regulations are driving up disposal costs. Deep well injection of hazardous waste is also being limited by regulation often driven by community pressure.

Various methods of destroying waste are being employed today to avoid the use of unacceptable disposal techniques. Sludge refuse, for example, is being treated by lime encapsulation, drying and in-vessel composting and similar technologies. New technologies are being developed to destroy waste or at least render the waste safe for disposal. Among those technologies showing promise is supercritical wet oxidation (SCWO).

Supercritical water oxidation (SCWO) raises the water borne waste to a pressure greater than 3,200 psia, and to temperatures greater than 702 degrees Fahrenheit. Under these conditions, water acts as an excellent solvent for organic compounds and air. The oxygen in the air oxidizes the organic matter converting them to the harmless inert products of oxidation—carbon dioxide and water. Researchers such as Modell, Gloyna, Li and others have demonstrated the effectiveness and efficiencies of supercritical water oxidation in destroying organic waste. Destruction efficiencies reaching virtually 100% have been demonstrated and create nearly undetectable levels of pollutants such, as nitrous oxide.

The prior art is replete with means to implement wet oxidation of aqueous wastes. Supercritical oxidation described in U.S. Pat. Nos. 4,338,199, issued Jul. 6, 1982, and 4,543,190, issued Sep. 24, 1985 both to Modell. U.S. Pat. No 4,822,497, issued Apr. 18, 1989 to Hong et al discloses high destruction efficiencies and is typical of the supercritical water oxidation designs being commercialized. Most systems described in the literature use either pure oxygen or oxygen in air. Others use liquid oxidant such as hydrogen peroxide as taught by Welch et al in U.S. Pat. No. 4,861,497.

Generally, designs of supercritical water oxidation systems found in the literature are composed of six basic components. The first is a means to pressurize the incompressible waste water; second, the oxidant is added and mixed with the waste water; third, heat is added; fourth, a chamber provides sufficient volume for reaction; fifth, a pressure letdown means; and sixth, a means of effluent cooling.

The prior art illustrates attempts to reduce operating costs of water oxidation by recovering waste heat. Effluent gases are expanded through turbines to drive a generator, as taught again by Pradt's U.S. Pat. No. 4,100,730. Pradt's design primarily is a two-phase subcritical, oxidation system. Operating pressure in this system is typically 800 psi and full oxidation of organic material requires a long reaction time that does not react all organic matter in the waste. Modell, in U.S. Pat. No. 4,338,199, discloses essentially the same process as Pradt except that operating pressure and temperature are supercritical. Modell, as does Pradt, separately mixes the oxidant and organic water after compression of each thereby requiring a separate pressurization means for both. U.S. Pat. No. 5,147,564 to Titmas discloses that energy can be recovered from SCWO by expansion of reacted waste fluids through converging-diverging nozzles mounted for rotation on a reaction barrel. This method of energy recovery, again, must pass high velocity fluids over the nozzle material. Waste containing even a small amount of nonorganic material will erode the nozzle material in a relatively short period of time. Titmas utilizes the usual, expensive, and complicated means of compression and oxygen delivery. Separate air or oxygen compressors compress the oxidant and conventional pumps pressurize the waste water.

Dickenson, in U.S. Pat. No. 4,898,107, provides a wet oxidation system that oxidizes liquid or solid wastes and recovers energy from expansion of reacted gases.

Various means of externally combusting fuel is shown in the art. Some methods employ the Brayton cycle, as disclosed by Albert in U.S. Pat. No. 4,864,814. Fuel is mixed after the compressor and operates at considerably lower pressure than supercritical pressure, with reference to water. Another example of an external combustion heat engine is disclosed by Porter in U.S. Pat. No. 4,336,686 which includes a constant volume rotary piston engine. Again, fuel is added after the compressor and operates essentially on a constant volume air cycle.

Expansion of supercritical water oxidation effluent through turbines requires that the water to be free of inorganic materials that could erode the turbine blades. Modell offers various methods of ash and salt separation at high pressure that will take out most, but not all, such material. Pradt teaches that a batch reactor or reactors operate so that, periodically, a single reactor loaded With sufficient fuel and water operates for a period of time and then shuts down to remove any organic particles. Titmas shows, in U.S. Pat. No. 5,147,564, a filter placed in the high pressure, high temperature flow before expansion of the flow. This arrangement, however, requires periodic maintenance of the filter. The entire system shuts down to allow filter removal or a parallel set of filters and a three-way valve is installed to keep the system on-line.

Titmas and others teach that the high pressure required for successful wet oxidation can be achieved by circulating water through a long reactor reaching deep into the ground. Supercritical water pressures are achieved at depths of 2,000 to 5,000 feet. These great depths create tremendous maintenance problems once such a system is in place due to the inaccessibility of the reactor.

Various heat engine cycles convert heat into mechanical or shaft power. Two of those cycles are the Rankine and Brayton cycles. The Rankine cycle, which describes the thermal process of the steam engine, as theorized by Lord Rankine, is described as follows:

1) isentropic pressurization of water, 2) constant pressure addition of heat (boiling to produce superheat steam), 3) isentropic expansion of steam, 4) isothermal rejection of heat (condensation of steam).

The Brayton cycle, which is embodied in gas turbine engines, is described as follows:

1) isentropic compression of gas, 2) constant pressure heat addition (combustor), 3) isentropic expansion of gas, 4) constant pressure, isothermal heat rejection (exhaust to atmosphere).

The Barber cycle, as disclosed in this invention, combines the Rankine and Brayton cycles to form a new cycle that shares some characteristics of both. The Rankine cycle seeks to use pure water, or other appropriate liquid, as its working fluid while the Brayton cycle seeks to use a pure gas as its working fluid. A sizable portion of waste produced is organic matter dissolve or suspended in water. The Barber cycle combines the working fluids, air, water and organic matter before the cycle begins. This cycle is described as follows:

1) isentropic compression of gas and water, 2) constant pressure heat addition (reactor or combustor), 3) isentropic expansion of gases, 4) constant pressure, isothermal heat rejection (condenser or exhaust to atmosphere)

The result is a cycle that is more efficient than the Rankine cycle alone when operated between the same pressures and temperatures.

Pressurization of water is relatively simple in that conventional pumps can easily achieve the required pressures of up to 6,000 psi and tolerate small particles in the waste streams. Compression of gaseous oxidants to the same pressures requires complicated and very expensive compressors. Piston compressors must be oil free and provide cooling between stages to prevent organic ignition and possibly metal ignition. Oxygen enters the process in a liquid state at the pressures required for supercritical operation but only through expensive and dangerous cryogenic and evaporation systems. Therefore, a need exists for a supercritical water oxidation system that can inexpensively use air as the oxidant to destroy waste while efficiently producing shaft horsepower for generation of high value electricity.

The prior art, as discussed above, shows various means of destroying aqueous wastes. Some harness the energy and convert it to shaft power while others use the hear to generate steam for in plant use, and others simply dissipate the energy into the environment. Most of the prior art process oxidants such as liquid oxygen or hydrogen peroxide. Those who use oxygen from the air employ expensive and energy inefficient, multiple stage, oil-less compressors to achieve the pressures required to achieve supercritical oxidation.

SUMMARY OF THE INVENTION

It is a primary object of the present invention to destroy water borne wastes at the least operating cost.

Another object of this invention is to provide single stage compression.

Still another object of this invention is convert excess energy created into shaft work to perform useful work such as driving a generator.

Yet another object of this invention is to provide unique pressure reduction means.

Another object of this invention is to provide an inherent heater during compression.

Yet another object of this invention is provide a reactor design that allows chemical reactions to occur at higher than normal temperatures using common materials.

In accordance with the invention, generally stated, the present invention combines the advantages of employing air as the oxidant with a simple low cost compressor. The essence of this compressor is the utilization of water and waste, combined with air, injected into the inlet of the compressor. Mixing atomized waste water with air helps cool the air during compression significantly reducing power required for compression. Otherwise air temperatures would exceed 2,500 degrees Fahrenheit. Conventional method of cooling compressed air requires expensive air heat exchangers and multiple stages of compression.

To achieve single stage compression over such a wide compression range a flexible, liquid piston has been employed in the phase of compression. The liquid piston fills the normally upswept volume in the compression cylinder. A single stage compressor will probably run at lower speeds than a conventional compressor but eliminates the extra expense of multiple compression stages.

As previously mentioned, prior art has shown recovery of heat through heat exchangers from the wet oxidation process to offset operating cost. While this does reduce the operating cost of such a unit it does not provide the high value that the creation of shaft work produces. The prior art generally shows a pressure reduction valve that absorbs the entire pressure drop that ranges from 3,500 to 6,000 psia down to atmospheric pressure across an orifice. Unless all inorganic solids are removed before this point, rapid erosion occurs rendering the valve useless. The present invention allows the high pressure supercritical fluid to enter a cylinder and expand against a piston. Conventional wet oxidation systems require a heater, either gas or electric, to bring the water borne waste up to reaction temperature.

DESCRIPTION OF THE PREFERRED EMBODIMENT

Figure 1:
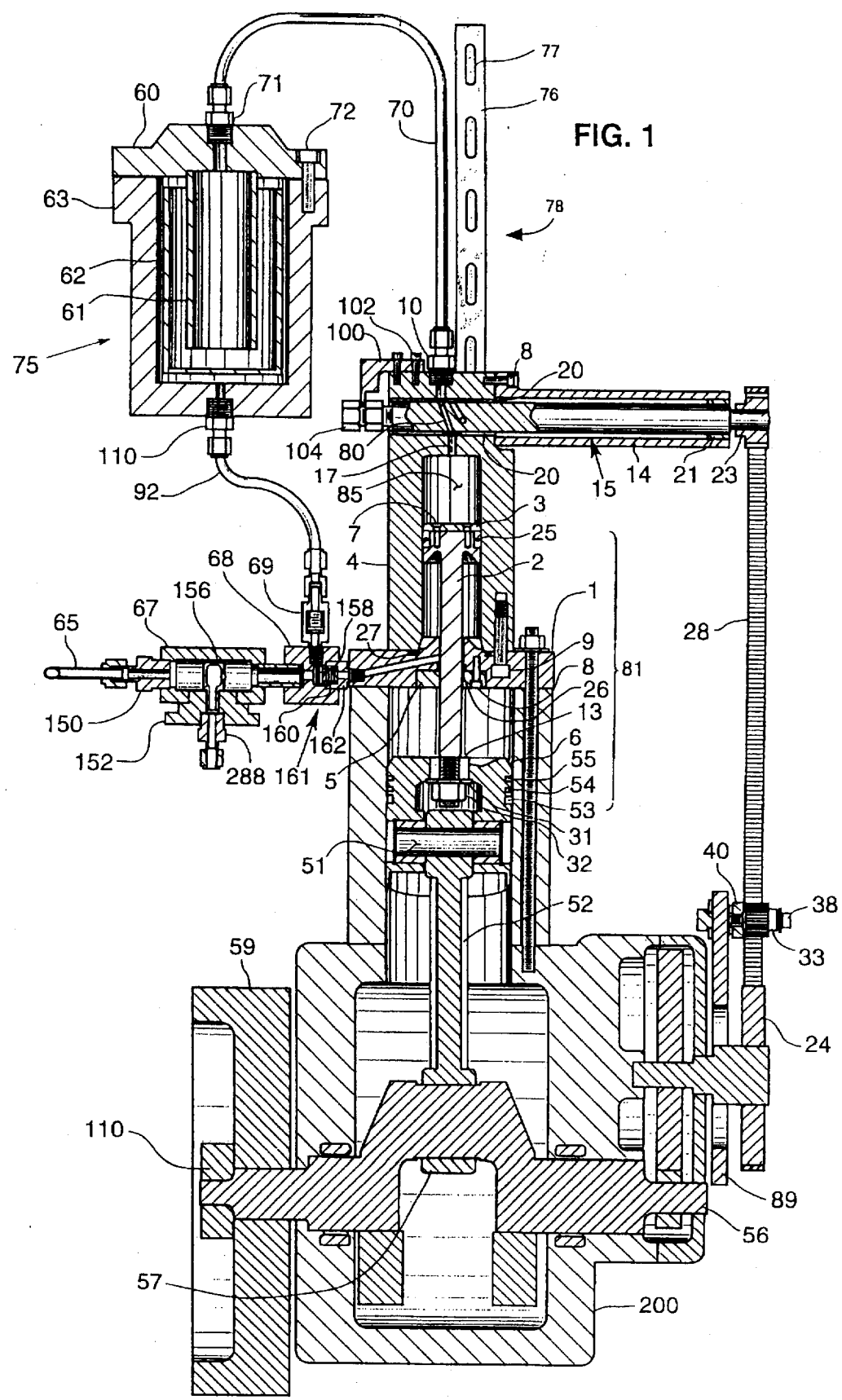
FIG. 1 is a cross sectional view of the waste disposal engine.
Figure 2:
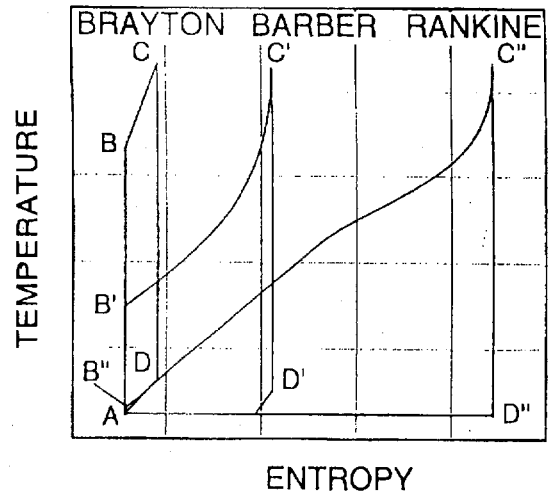
FIG. 2 illustrates the thermodynamic cycles of the waste disposal engine in terms of entropy and temperature.
Figure 8:
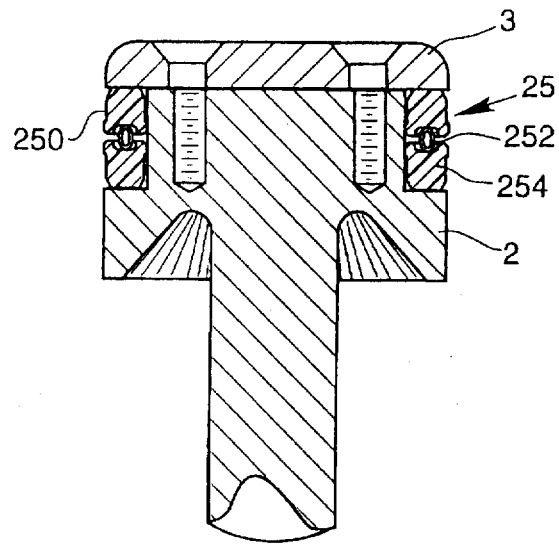
FIG. 8 is a cross sectional view of the compressor and expander piston.
Figure 10:
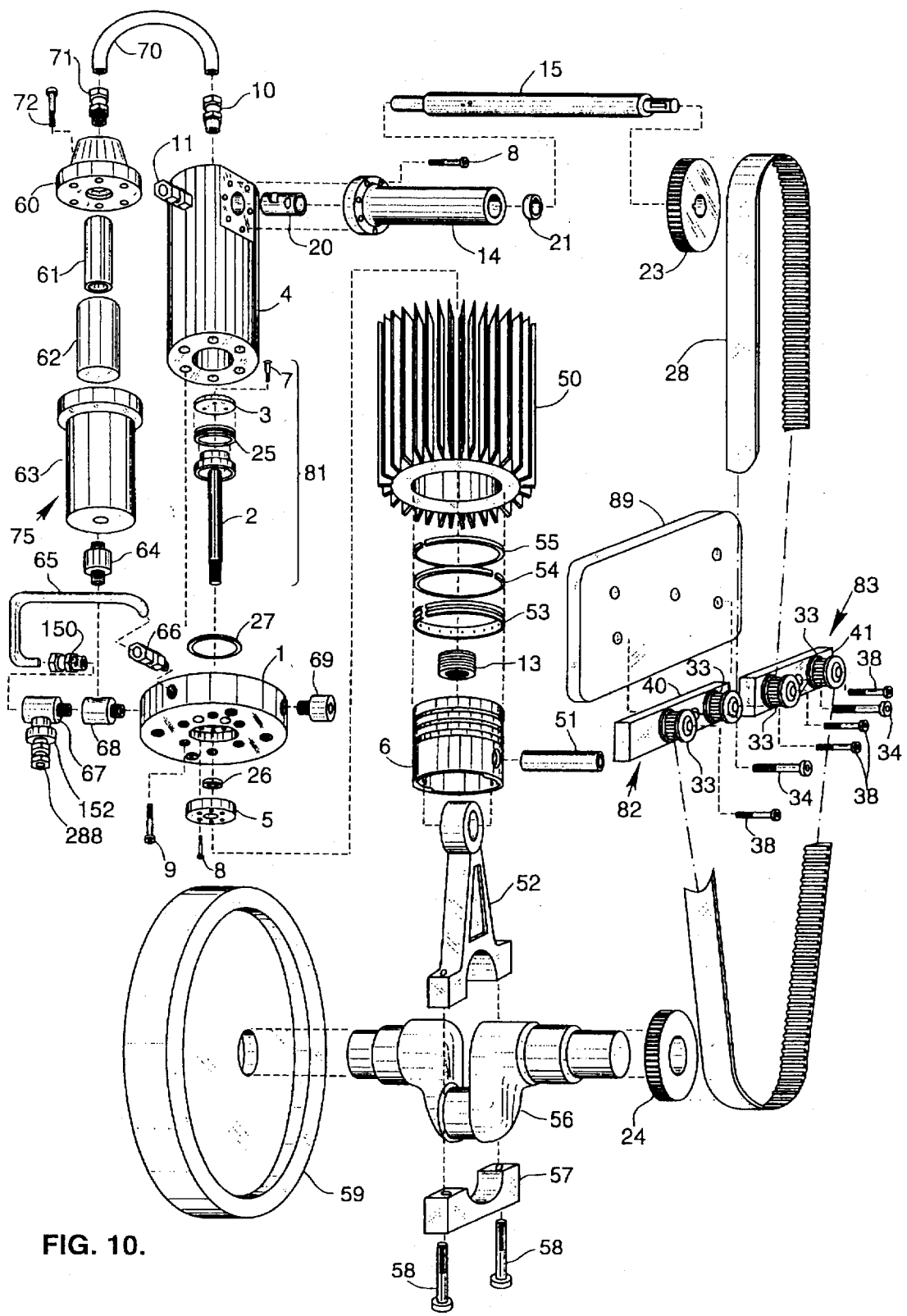
FIG. 10 is an exploded isometric view of the two stage compression, waste disposal engine.

In referring to the drawings, particularly FIGS. 1, 2 and 10, the basic elements and concepts of the invention are shown. Mounted for rotation is crankshaft 56 and drivingly attached to a flywheel 59. The crankshaft 56 drives through single direction and continuous rotation connecting rod 52 and first stage compression piston 6, joined by wrist pin 51, in a reciprocating motion. Connecting rod 52 is connected for free rotation to crankshaft 56 by clasping element 57 and bolts 58 directed through 57 and threaded to connecting rod 52. Piston 81, which provides 2nd stage compression on the bottom side and expansion on the top is attached to piston 6 by nut 13 that is threaded on both the inside and outside. The outside of nut 13 threads into the piston 6. Piston 6 is threaded into the inside of nut 13. Gas sealing for piston 6 is provided by compression rings 54 and 55 against the interior of cylinder 50. Oil splashed from the crankcase is retained to lubricate the sliding motion by the oil ring 53. First stage compression is achieved by reducing the volume of air between piston 6 and its encircling cylinder 50, as capped by its base plate 1. Gas seal around piston 2 stem is provided by seal 26. Seal 26 is retained by seal retainer plate 5 and fastened to plate 1 by fastener 8. Base plate 1 is fastened to cylinder 4 with bolt 9 and sealed from gas leakage with seal 27. Gas leakage on both sides of the second stage compressor and expander piston is prevented by double acting seal 25 that is fastened to piston 2 by piston cap 3 and fastened by bolt 7. Double acting seal is composed of three components. Seal 250 is Teflon® impregnated graphite, pressure actuated seal for the second stage compressor. Seal 254 is Teflon® impregnated graphite, pressure actuated seal for the expansion pressures on piston 2. Retainer spring 252 provides the initial load of seals 250 and 254 against cylinder wall 4. Air is compressed from first stage compressor into the second stage chamber and passes through the base plate fitting 66 and the conduit 65, into the mixer 67 which combines waste water transmitted through the fitting 288 into the nozzle 156 and the gaseous oxygen external to the second stage compressor 86. The mixer 67, comprised by a hydraulically actuated liquid atomization nozzle 156, combines atomized waste water with compressed air delivered through the conduit 65. An air or gas actuated nozzle could be suited for nozzle 156 to provide finer atomization of the waste water. The nozzle 156 could be replaced in such a manner as to atomize waste water internally at the second stage compression chamber 86, by a mounting nozzle 156 provided through the second stage compressor wall. Flow continues in one direction to the second stage pressure by check valve 68. The second stage compressor inducts its charge upon upstroke of piston 2 and expels same charge on downstroke back through an exit port in 68 to check valve 64. Check valve 64 holds pressure at reactor pressure and maintains flow in one direction towards the reactor 75.

Reactor 75 is composed of four components to protect the pressure vessel from the high temperatures of reaction. Compressed fluid enters the bottom of reactor 75 and moves quickly around the outside of reaction shield 62 and enters the top of reaction shield 62 and flows through the annular passage between inner reaction shield 61 and around the bottom of inner reaction shield 61. Flow of the reacting fluid now continues through the inner cavity of inner reaction shield 61 and exits through reactor top flange 60. Reacted fluids pass from the reactor 75 and into the port 17, by way of passing through the flange 60, the fitting 71, and the tube 70, into the expansion cylinder fitting 10.

Admission of high temperature, high pressure reacted fluids into the expansion chamber 85 is controlled by rotary valve 15 through port 80. Rotary valve 15 rotates continuously, synchronized to crank shaft 56, and is driven by cogged pulley 23 and timing belt 28 and in turn driven by timing pulley 24. Port 80 lines up with port 17 on cylinder 4 when piston 81 is positioned at the top or past the top of the stroke. Timing of rotary valve 15 port 80 to open into the expansion chamber 85 past top-dead-center is controlled by advancing or retarding the rotary valve by rotation of idler pulley timing assembly 82. Tension for timing belt 28 is provided by spring loaded rotation in the counterclockwise direction by idler tension assembly 83. Rotation of idler pulley timing assembly 82 in the clockwise direction advances or accelerates rotation of valve 15 so that expansion chamber 85 is larger in volume due to the downward travel of piston 81 and a greater mass of reacted gases is admitted into the expansion chamber 85. Likewise, less gas is admitted into the expansion chamber 85 if the idler pulley timing assembly 82 is retarded counter clockwise due to the smaller expansion chamber 85 volume. Metering gas mass into expansion chamber 85 is necessary to control pressure in reactor 75.

The rotary valve 15 is sealed against high pressure in expansion chamber 85 by combination seal and bushing 20. Seal 94 seals gases entering from the reacted fluids passage 17 of cylinder 4 against leakage to the atmosphere around rotary valve shaft 15. Seal 94 is pressure actuated such that the thin feathered portion of seal 90 flexes against the pressure of the reacted gases and conforms to the rotary valve shaft 15. Similarly, seal 90 seals pressure gases in the expansion chamber from escaping to the atmosphere by conforming to shaft 15. Pressure actuated edges of the seal conforms to rotary valve 15 after reacted gases are admitted through passage 80 in expansion chamber 85. Exhaust gases are also sealed against atmospheric pressure by a similar seal 92. Feathered edges of seal 92 press against rotary valve 92 when the exhaust pressure is desired to be maintained at a pressure above atmosphere.

Idler pulley timing assembly 82 is composed of two idler pulleys 33, and is fastened to mounting plate for free rotation by shoulder bolts 38. Idler tension assembly 83 is also composed of idler pulleys 33 and fastened to idler tension assembly mount plate 41. Both idler pulley assemblies are mounted to control plate 89 for free rotation by shoulder bolt 34.

The condenser 78 condenses steam present in the reacted gases forced from the chamber 86 through the port 17, the valve passage 79, the feathered seal 92 on seal and bushing 20, and the fitting 11. Compression fitting 11 seals around the condenser tube 77, attaching the condenser to the engine exhaust. Condenser fins 76 are connected are connected for good thermal conductivity to tube 77, to extend the heat transfer area. This condenser is designed to transfer heat to the lower temperature ambient air, but could transfer heat to other fluids such as water or oil, or other suitable heat sink.

As previously mentioned the principle of this invention is to destroy organic waste matter at the lowest possible cost to the user by incorporating significant refinements such as utilization of air as oxidant while employing simple compressors, cool wall reactor and direct energy recovery. The principle involved in destroying the waste is called supercritical wet oxidation (SCWO) which operates at high pressure (greater than 3,200 psia) and temperature (greater than 702° Fahrenheit). This invention effectively and directly harnesses the high pressure and temperature condition resulting from the SCWO process by producing shaft power used to drive generators or do other useful work.

The process by which this invention operates is best described as a combination of elements of the Rankine (steam engine or turbine) thermodynamic cycle and the Brayton (gas turbine) thermodynamic cycle to form a hybrid cycle. The thermodynamic cycle of this invention, shown in FIG. 2, compresses a substantial mixture of water borne waste and air premixed before any substantial compression to the elevated pressure characteristic of SCWO, FIG. 2, (a) to (b). Oxidation of the waste is employed to produce the heat necessary to elevate the air, water, waste mixture temperature to a level necessary to complete oxidation of the organic matter present in the mixture, FIG. 2, (b') to (c'). The Brayton cycle compresses air to an elevated pressure, FIG. 2, (a) to (b) where fuel is added in the combustion chamber, after the compressor, where ignition occurs, FIG. 2, (b) to (c). In some cases relatively small quantities of water are added to the Brayton cycle machines for air cooling which lowers the air density and improves air induction efficiency. Compared to the quantity of water and waste mixed with air entering this invention, any such additions of water in the Brayton cycle are negligible and designed for different purposes. Again, note that the Brayton cycle mixes its fuel after compression. Reaction or combustion of the mixture in this cycle is again unique in that the water and air exist side by side similar to the Rankine cycle's two phase portion of heat addition where water boils into a single phase steam. In SCWO, the water portion of the mixture transforms from a liquid phase to a unique phase that has properties that are characteristic of both a gas and a liquid. Water in this phase is compressible and behaves as a gas. Expansion of the single phase fluid produced in the reactor, FIG. 2 (c') to (d'), against a piston produces energy to drive the compressor with enough excess energy available for useful purposes such as driving a generator.

The expansion of this cycle is similar to the Rankine cycle, FIG. 2 (c") to (d") in that if allowed to expand to a low enough pressure (usually atmospheric) the water phase condenses from steam into water. Temperature of condensation in this hybrid, FIG. 2, (d'), is higher than steam exit condensation, FIG. 2 (d"), in the Rankine cycle but lower than the air Brayton cycle, FIG. 2 (d). This hybrid cycle exit temperature is very nearly that of the Rankine cycle due to the great heat capacity of water and exhausts at substantially the same temperature as the saturation temperature as water, FIG. 2 (d'),. This produces an essentially isothermal heat rejection as is found in the Rankine cycle. The Brayton cycle working fluid exits the expander at a temperature considerably higher than the temperature of the working fluid entering the cycle, FIG. 2 (d).

One object of this invention is met by mixing water and air before compression to provide cooling and reduction of power required to compress oxidant gases. Air compressed without cooling would reach temperatures more than 2,500 degrees Fahrenheit damaging all parts in contact with the air during and after compression. Another problem with air temperatures reaching such heights is the possibility of ignition of lubricating oil found in common air compressors. With the mixing of the proper mount of water and waste necessary for successful SCWO with the air, the mixture temperature rises no higher than 400°–450° Fahrenheit. The fluid at this temperature is passed into the reactor 75 and used to insulate and protect the pressure vessel wall 63 against a reactor core temperature that can reach 1,400° Fahrenheit. Given enough reactor residence time, waste is broken down into their constituent components that are typically water, carbon dioxide, nitrogen. Proper reactor residence time, which is time the air and waste and water spends in the reactor, ranges from 45 seconds to two minutes. Residence time should properly begin when waste material and oxygen reach approximately 850° to 900° Fahrenheit. Reacted waste products leave the reactor and enter the expansion chamber 85 through a rotary metering valve 15. This valve meters flow into the expansion chamber 85 by varying the dwell or measure of volume exposed in the expansion chamber while the valve opening exposes the reactor exit to the expansion chamber. By metering flow into the expansion chamber 85, the pressure of the reactor is regulated. A pressure rise in the reactor 75 is relieved by releasing into the expansion chamber 85 more gas mass than is being forced into the reactor 75 by the compressor. Expansion of reacted gases against the piston 81 produces work greater than that required to power the compressor. Condensed water vapor and other gases pass from the expansion chamber 85 by upward travel of the expansion piston 81 by reducing the volume of the expansion chamber 85.

Figure 9:
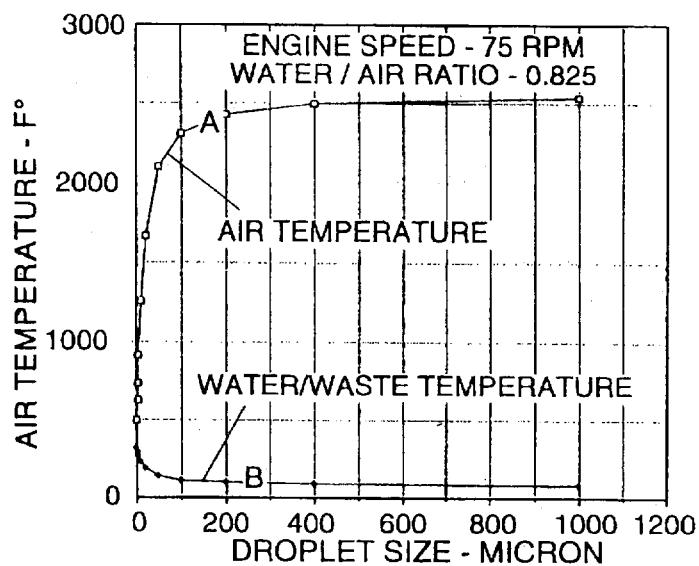
FIG. 9 illustrates the impact of droplet size on air temperature during compression.
Figure 3A:
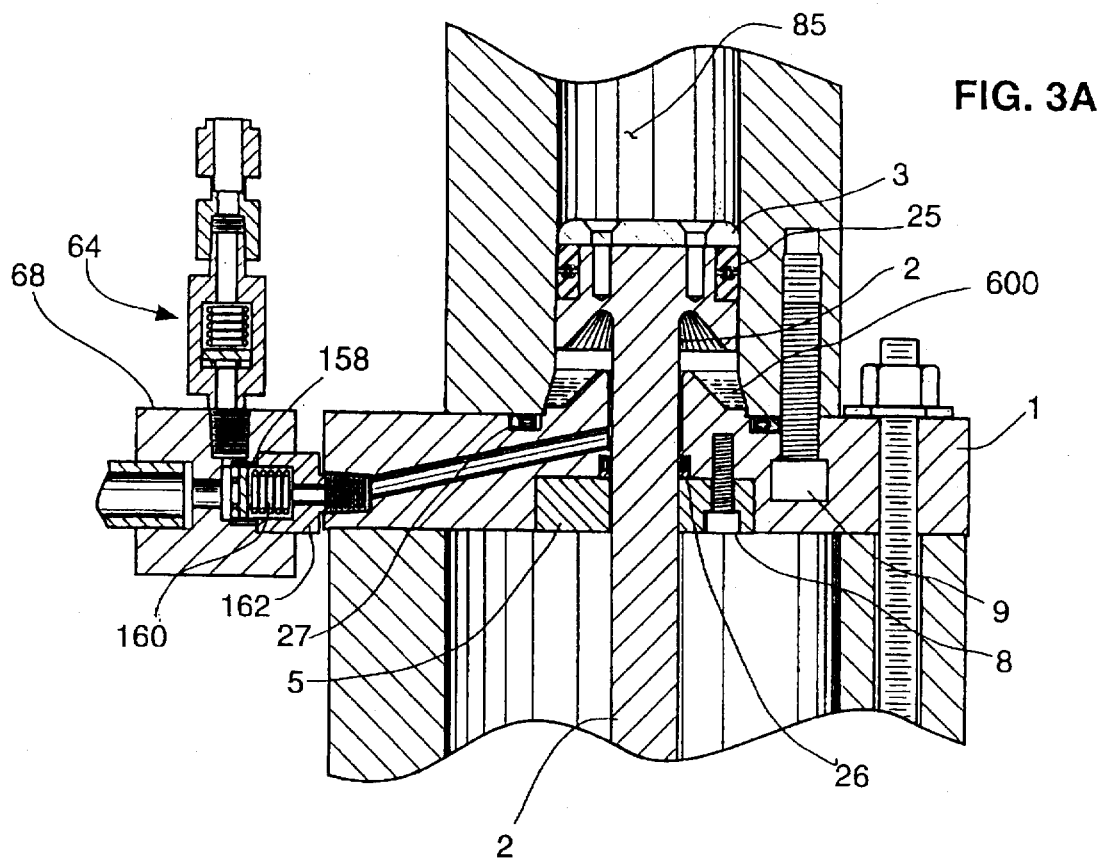
FIG. 3A is a cross sectional view of the single stage compressor in the early phase of the compression stroke before the water is contacted.
Figure 3B:
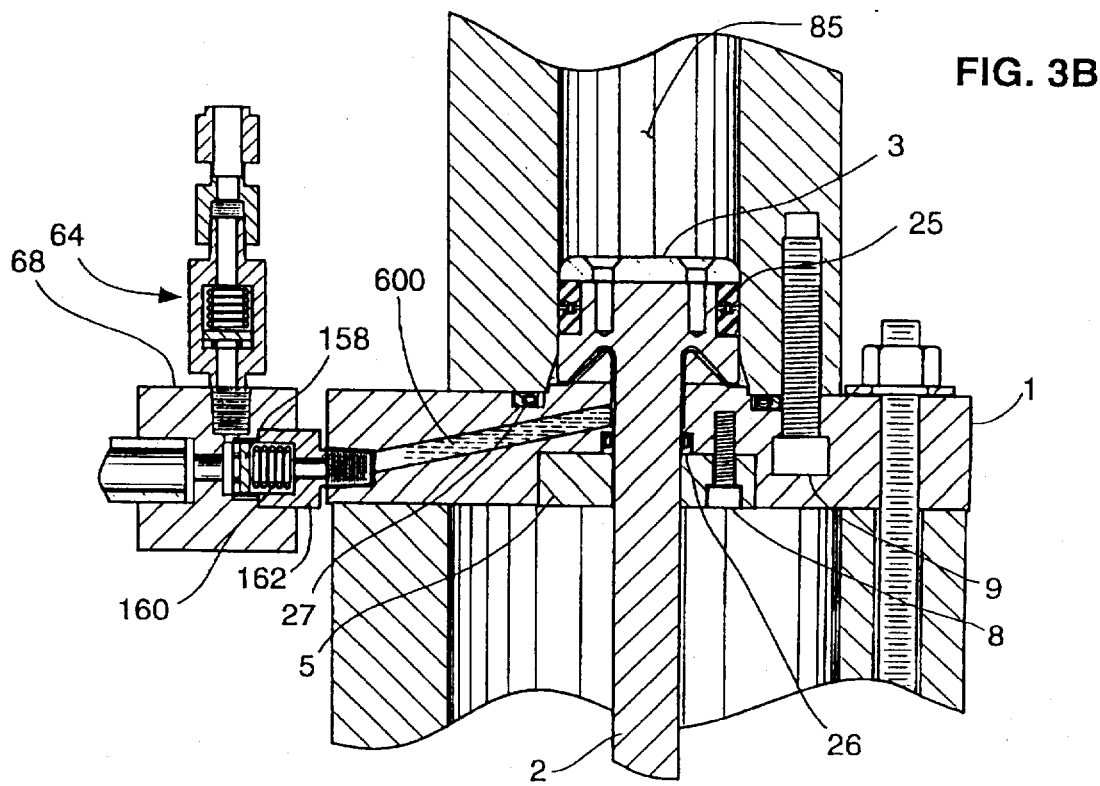
FIG. 3B is a cross sectional view of the single stage compressor in the later phase of the compression stroke after the water is contacted.
Figure 4:
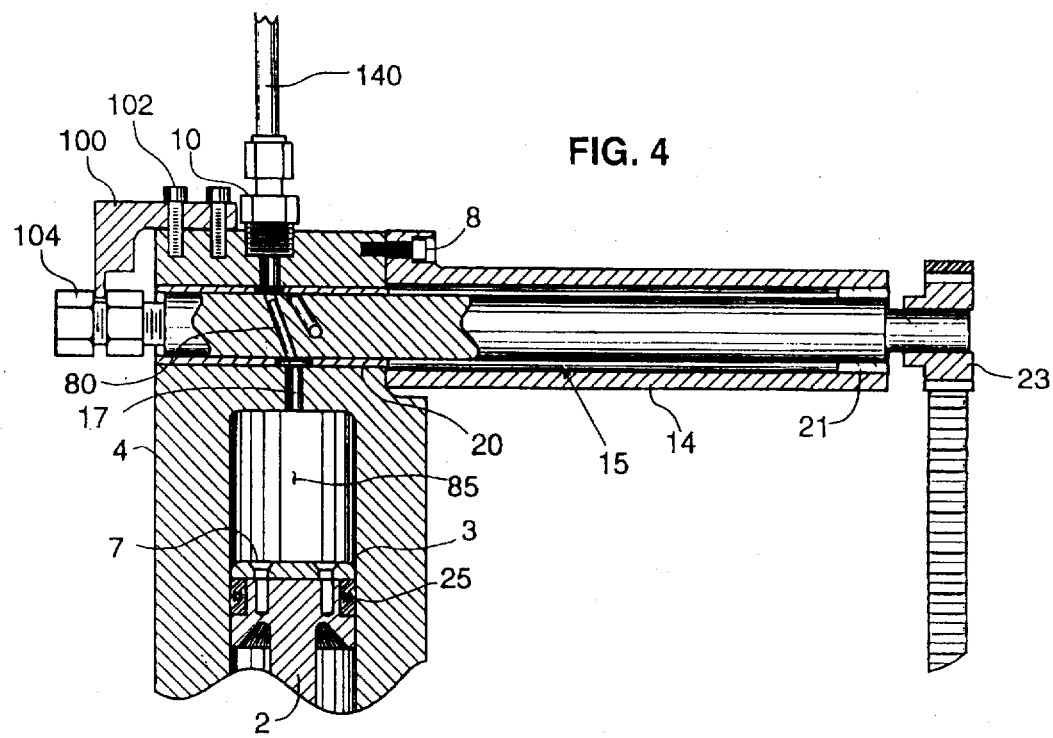
FIG. 4 is a cross sectional view of the expansion rotary valve.
Figure 5A:
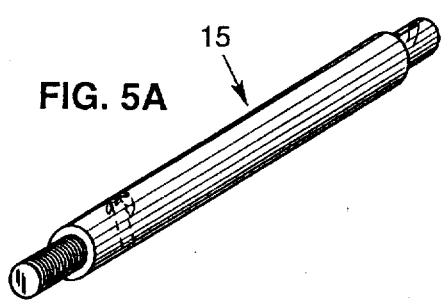
FIG. 5a is a right isometric view of the rotary valve and seals.
Figures 5B, 5C:
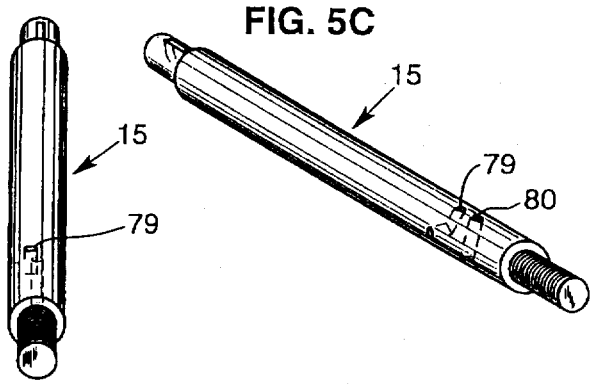
FIG. 5b is a center isometric view of the rotary valve and seals.
FIG. 5c is a left isometric view of the rotary valve and seals.
Figure 11:
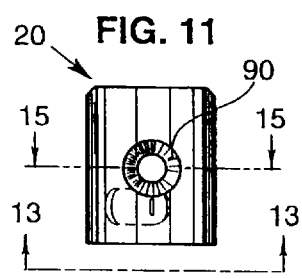
FIG. 11 is a top view of the seal and bushing combination.
Figure 13:
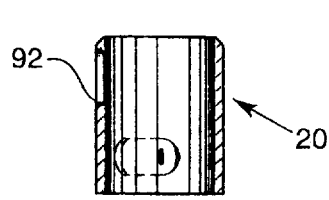
FIG. 13 is a sectional view of the seal and bushing combination showing details of the exhaust port and feathered edge seat.
Figure 15:
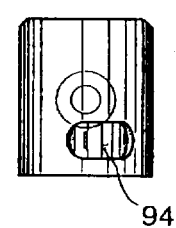
FIG. 15 is a bottom view of the seal and bushing combination showing the slotted seal port on the rotary valve seal.
Figure 12:
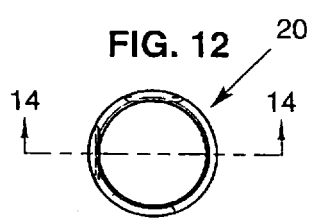
FIG. 12 is an end view of the seal and bushing combination.
Figure 14:
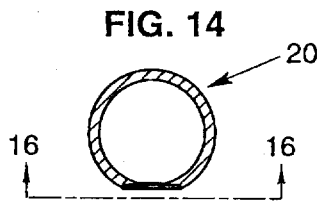
FIG. 14 is a sectional view of the seal and bushing combination showing the details of the cylinder port and feathered edge seal.
Figure 6:
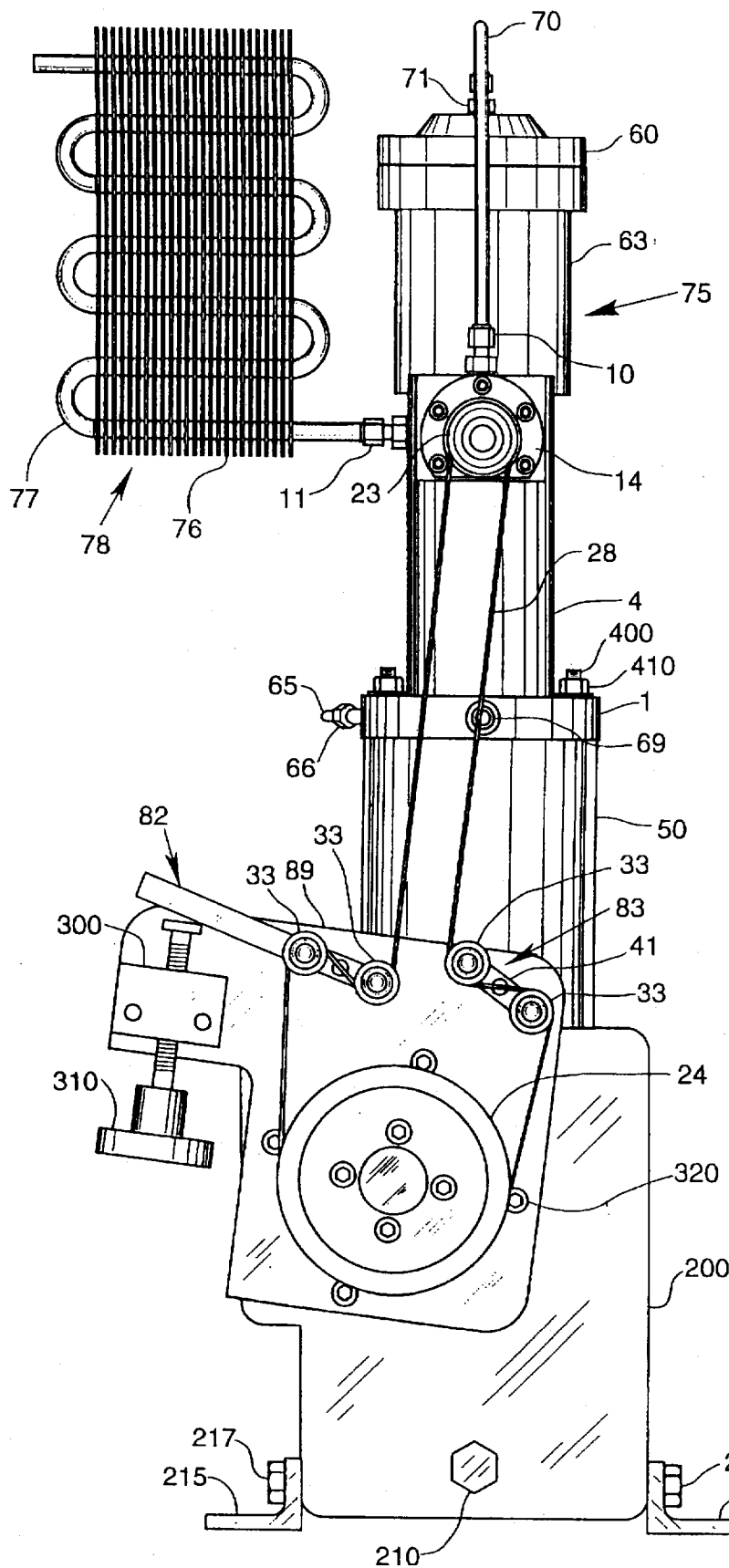
FIG. 6 is a front elevational view of the rotary valve drive belt and variable valve timing mechanism.
Figure 7:
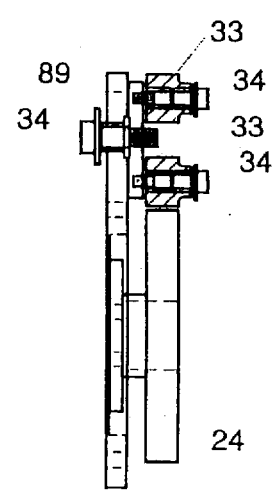
FIG. 7 is a side elevational view of the rotary valve drive and timing mechanism.

The cycle will be examined in detail by first describing the mixing of air, waste and water. The waste and water are premixed before atomization and mixture with air. An atomization nozzle, either air atomized or hydraulically atomized, can be used to produce droplet sizes less than 300 microns. Air atomizing nozzle can produce droplet sizes less than 100 microns. Small droplet sizes and their surface to volume ratio are necessary to absorb heat generated from the air during compression. Ignition of volatile components can be avoided during compression or even before entering the reaction zone by properly sizing the atomized droplet. Proper selection of the atomized droplet determines air and water temperature. For example a droplet size of 1 micron is estimated to reach 315° Fahrenheit while the air temperature reaches 505° Fahrenheit before exiting a compressor whose crank is turning 75 revolutions per minute. Also, at the same crank shaft speed and a waste and water droplet size of 5 microns the air temperature will reach 925 degrees Fahrenheit while the droplet reaches 270 degrees Fahrenheit. An estimate of the effects of water droplet size on water and gas temperature is shown on curves (a) and (b) of FIG. 9.

Compression in the preferred embodiment is described as two stages. The first stage is the compression of air from atmospheric pressure to approximately 100 psia. An example of a means of hydraulically atomizing the waste and water mixture with air is the Spraying Systems Whirl Jet® nozzle, 156. The mixture then flows into the second stage compressor where the charge is compressed to a pressure of approximately 6,000 psia. The reaction pressure is determined by the partial pressure of water. The mass portion of water in the mixture should be set so that the water pressure and temperature is that of supercritical water (approximately 700 degrees Fahrenheit and 3,200 psia).

The preferred embodiment shows a poppet style check valve 161 between the first and second stage and between the second stage compression 64 and the reactor. Poppet check valves have a lower moving mass and should provide longer operating service life than some of the other types of check valves available. If the waste contains substantial solid matter, then a sharp seat type of check should be considered and possibly slower speed shaft operation to reduce the valve duty cycle.

The preferred embodiment also shows compression staged in two steps employing essentially a solid piston displacing both compression chambers. Compression may also be accomplished in a single stage by pushing a clean slug of water 600 by the solid piston such that the slug is interposed between the air, water, and waste mixture by pushing the mixture toward the reactor through a check valve. The slug of water acts as an extension of the solid piston but has the advantage of being able to conform to the normally upswept portion of the compression chamber. Upswept areas include the clearance between the cylinder and piston and conduit to the check valves operating on the compression chamber. Such an arrangement requires a separate means (not shown) to conduct the water slug out of the compression chamber precisely as the check valve interposed between the reactor and compressor closes. On the next stroke before compression, a fresh slug of water is injected into the compression chamber as the piston nears the end of the compression stroke. Such a compressor could simplify the compression process by consolidating two stages into one.

Oxidation of the organic matter in the waste adds heat in the reactor. Fluid temperature exiting the compressor ranges from 400° to 450° Fahrenheit and rises to approximately 1,000° Fahrenheit before complete destruction of the organic matter occurs. To raise the temperature from 450° Fahrenheit to 1,000° Fahrenheit requires a high organic content in the waste stream. Depending on the fuel heating value (FHV) of the waste, the organic content of water ranges from approximately 12% to 25%. The exothermic or heat generating portion of the reactor occurs in approximately the first 10% of the total volume. The remaining portion of the reaction, which destroys the last portion of organic matter, occurs in the remaining 90% of the reactor. Products of oxidation are gaseous and depend on the composition of the waste oxidized. For example a simple hydrocarbon such as methane produces water and carbon dioxide. A nitrogen compound such as an amine will produce water, carbon dioxide and nitrogen. Both cases will produce a very small amount of other compounds such as nitrous oxides ($NO_x$) but are unlikely to be consequential.

Expansion of the products of combustion produces power that is sufficient to drive the compressor with enough excess power for other useful work. All constituents of the gaseous products of combustion remain a gas through out the expansion phase of the cycle until the water vapor condenses due to the temperature drop of expansion. All inorganic matter remaining after oxidation remains suspended in the gases. These solids may be removed from the products of oxidation gases by expanding the gases to a pressure above the saturation pressure of water. Exhausting the gases into a sufficiently large chamber will allow the velocities of the gases to slow so that the solids will drop out. Another method passes the gases and solids through a gas cyclone to centrifugally separate solids from gas.

Returning now to the mechanical characteristics of the reactor 75 described in the preferred embodiment, the reactor 75 is a cool wall design that uses the entrance gases, which enter at approximately 450° Fahrenheit, to cool the pressure bearing wall. The entrance fluids flow in an annular region between the pressure bearing wall 63 and a thinner inner wall 62. This cooling technique allows the designer greater flexibility in selecting materials for the pressure bearing wall. The velocity of gas moving past the wall must be high to reduce the residence time of the gases in this region. As discussed earlier, the majority of organic oxidation takes place in the first 10% of the reactor. Reaction should not begin in the cooled zone next to the reactor pressure bearing wall 63 due to the temperature rise and the chemical reaction impact on the wall material itself. The velocity should be designed such that the oxidation front velocity must be less than the air, waste and water mixture velocity. This effect can be observed in the burning of a welder torch where a visible gap is seen between the time and the torch tip. This zone is the mixing and heating zone. Once the water, waste and air mixture passes the pressure bearing wall 63 and turns 180 degrees around the thinner inner wall 62 while moving radially inward. The fluid now slows to a velocity where steady oxidation can occur. All oxidation can occur in this zone or take another pass between a third inner concentric wall 61 as described in the preferred embodiment. If the fluids exiting the compressor enter the reactor on the same end as the reacted fluids exit, then only a pair of concentric cylinders is required to cool the outer wall. If the fluids exiting the compressor enter the opposite end of the cylinder reactor as they exit as described above and is the preferred embodiment, then three concentric cylinders are required.

A self cooled reactor wall depends on a high organic content. Sufficient heat must be added by oxidation after the cooler fluids make their first pass inside the pressure bearing wall. Wet oxidation techniques found in the prior art generally treat dilute, low energy waste. An external source of heat is then required to raise the waste, water and oxidant mixture to a temperature sufficient to oxidize the organic matter. When then unreacted fluids reach the reactor their temperature is to high to provide substantial wall cooling.

The rotary valve 15 described in this invention has as its primary purpose the timing and metering of reacted gases exiting the reactor 75. Timing is accomplished by driving the rotary valve with a cogged or timing belt 28 by the drive shaft pulley 24 and drive shaft 56. When the passage 80 through the valve 15 aligns with mating passages in the seal and housing, the reacted gases from the reactor pass into the expansion chamber 85 formed between the piston 81 and the top of the cylinder. The valve is timed such that when the piston is at the top of the stroke, which forms a minimum expansion chamber 85 volume, the rotary valve 15 opens a passage from the reactor to the expansion chamber. The dwell or time the passage is open determines the mass of gasses allowed to leave the reactor 75.

The seal and bushing combination 20 provides sealing of the rotary valve 15 to the atmosphere. The rotary valve 15 rotates in the bushing, providing the usual degree of bearing a bushing provides, but adds to its function a pressure actuated seal. The bushing 20 interface between the entrance from the reactor 75 to the valve is formed by countersinking the bushing 94 from the reactor side such that the thin piece of material left conforms with the valve and presses against the valve in response to the reactor pressure. The bushing conforming to the rotary valve in this region seals the reactor gases from passing into the atmosphere. Similarly, the seal and bushing 20 interface between the rotary-valve 15 and the expansion chamber is formed by counter boring from the expansion chamber side of the bushing leaving a thin section of material 90 between the expansion chamber 85 and the rotary valve 15.

When the reacted fluid gases pass through the rotary valve into the expansion chamber, the pressure from the expansion chamber seals the bushing and valve thin section 90 against the rotary valve forcing conformity of the bushing and seal against the rotary valve. This conformity seals the reacted gases from the passing into the atmosphere. In both the entrance and exit of gases to the rotary valve 15 the seal material provides some preloading due to the elasticity and slight inward preform of the seal material.

As discussed previously, rotary valve 15 variable timing is required to vary the mass flow of reacted gases exiting the reactor 75. In this invention, this is accomplished by shortening or lengthening the tension or driving side of the timing belt 28. In case the pressure in the reactor 75 has risen above a predetermined set point, the dwell or amount of volume the expansion chamber 85 that is exposed to the pressure of the reactor 75 is increased by shortening the tension side of the timing belt 28. Likewise the untensioned or slack side of the timing belt 28 must be lengthened. The mechanism used in this invention is two sets of two pulleys 82 and 83. One set, assigned to the tension, and the second set is assigned to the slack side of the timing belt 28. Each idler pulley 33 rotates freely about pins 38 firmly attached to adjustment arms 82. The adjustment arms are mounted for free rotation about a pin 34 rigidly mounted to a plate 89. The timing belt 28 is threaded between the pair of pulleys 33 on the tension side of the timing belt 28 so that clockwise rotation of the idle pulley adjustment arm 82 effectively shortens the tension side belt. Reduction of tension side belt length forces the driven rotary valve pulley 23 to advance in normal direction of rotation at a rate faster than would have occurred had the rotary valve pulley been driven by the crankshaft pulley. This causes the rotary valve 15 to open later than would have occurred if the rotary valve 15 had been directly driven by the crank shaft pulley 24. The expansion chamber 85, which then is exposed to the pressure of the reactor 75, while greater volume has opened in the expansion chamber 85 thereby causing greater mass to leave the reactor 75 lowering the reactor pressure.

Similarly, counterclockwise rotation of the tension side, idler pulley arm 82 will cause the tension side of the timing belt 28 to lengthen. The timing belt slack side will then shorten. The rotary valve 15 then retards so that the volume of the expansion chamber 85 exposed to the reactor 75 pressure is reduced. The amount of mass leaving the reactor 75 is reduced which raises the pressure in the reactor.

The mass of reacted gases exiting the reactor through the rotary valve and entering into the expansion chamber 85 places an expanding force on the top of piston 81. The expansion force drives the piston down to the bottom of the stroke releasing power to the crank shaft 56 through transmission of force through plunger 6 and connecting rod 52. During the expansion portion of the stroke, the rotary valve 15 rotates through a range where the reacted gases cannot escape the expansion chamber. Once the piston 81 reaches the bottom of the stroke, the rotary valve 15 rotates to a position so that the rotary valve port 79 aligns with the opening formed by rotary valve seal 90 and the exhaust port seal 92. The expanded, reacted gases pass from the expansion chamber into the condenser 78 through the fitting 11. Passage of the reacted fluids through the condenser 78 drives heat from the steam and non-condensing gases through the condenser tube wall 77, down the extended surface area fins 76 and into the lower temperature ambient environment.

A simpler tube type reactor (not shown) will perform adequately in this invention. In this type of reactor the unreacted mixture will leave the compressor through the high pressure check valve and flow through a tube or pipe of sufficient length to allow full reaction of the organic waste. The primary advantage of such a reactor is the relative simplicity of design. A disadvantage is that high temperature, reacting fluids are in full contact with the pressure bearing wall. The operating temperature in a tube reactor is lower that the preferred embodiment reactor due to strength limits of the material. Typically most materials such as stainless steel and high nickel alloys are limited to operating temperatures of approximately 1,000° Fahrenheit. This will lead to longer reaction times and larger reactors requiring a greater mass of expensive material.

Therefore a principal object of this invention to provide a water borne, organic waste disposal mechanism that minimizes construction and operating cost through wet oxidation and direct production of shaft power to drive generators or provide other high valued shaft work is achieved. Another object of this invention, to provide a new thermodynamic heat engine cycle that allows combined compression of air and waste water simultaneously and advantageous operating characteristics from both the Rankine and Brayton cycles is also achieved.

Furthermore, a high pressure reactor capable of operating with the pressure containing wall to operate at cool temperatures relative to the oxidizing fluids present in the reactor is provided.

Finally, the invention provides a means of pressure reduction from the reactor that can accommodate in organic, unreacted particles without excessive component wear.

These and other objects will become more apparent to those skilled in the art upon reviewing the description of the preferred embodiment set forth herein, when undertaken in conjunction with a study of the drawings.

Having thus described the invention what is claimed and desired to be secured by Letters Patent is:

1. A heat engine comprising:
    a gaseous oxidant, water and substantially organic fluid matter mixing means to provide for a mixing of said matter and affording their compressive cooling;
    a substantially isentropic compression means for compressing the mixed oxygen, water and organic fluid matter;
    a fluid matter conduit means connecting with said compression means and a substantially isentropic means of expanding the said fluid matter exiting from said fluid matter conduit means and arranged intermediate thereof;
    a substantially isobaric means of adding heat to fluid matter in said fluid matter conduit means; and
    a substantially isothermal means of rejecting expanded fluid matter heat.

2. The invention of claim 1 and wherein said isentropic expansion means includes a piston and cylinder arranged for expansion of fluid matter.

3. The invention of claim 1 and wherein said heat addition means includes a pressure vessel with at least one input port and at least one exit port.

4. A heat engine comprising:
    a combination of a piston and cylinder compression means constructed and arranged to isentropically compress a mixture of at least oxygen, fuel, and water fluid matter; and a piston and cylinder expansion means constructed and arranged to expand substantially isentropically said fluid matter;

a substantially isobaric reactor vessel conduit means external to said compression and expansion means arranged intermediate thereof to conduct said fluid matter from said compression means and said expansion means;

an oxygen, water, and fluid matter mixing means to afford compressive cooling;

a substantially isothermal means to reject expanded fluid matter heat;

a conduit means from an oxygen source to said compression means;

a control valve interposed between said oxygen source and compression means;

a conduit means from said compression means connecting to said external reactor vessel conduit means;

a control valve interposed between said compression means and said reactor means;

a second conduit means from said reactor means to said expansion means;

a valve means interposed between said reactor means and expansion means;

a third conduit means extending from the expansion means to heat rejection means; and a valve means interposed between the expansion means and said third conduit.

5. The invention of claim 4 and wherein said piston and cylinder compression means are of a multi-cycle operation and functions only as said piston and cylinder expansion means operates on alternate piston strokes.

6. The invention of claim 4 and wherein said piston and cylinder compression means are of a multi-cycle operation and functions only as said piston and cylinder expansion means operates on the same piston strokes.

7. The invention of claim 4 wherein said substantially isobaric reactor vessel means includes a pressure vessel with at least one input port and at least one exit port.

8. The invention of claim 7 wherein said substantially isobaric reactor vessel means only oxidizes fuel, air and water at water partial pressure greater than 3,206 pounds per square inch and at a temperature greater than 705° Fahrenheit.

9. The invention of claim 4 wherein said oxygen, water and fuel mixing means is mounted external to said compression means.

10. A heat engine comprising:

a combination of a piston and cylinder compression means constructed and arranged to isentropically compress a mixture of at least oxygen, fuel and water fluid matter;

a piston and cylinder expansion means constructed and arranged to expand substantially isentropically at least the reactant gases generated from said fluid matter;

a substantially isobaric reactor vessel conduit means external to said compression and expansion means and arranged intermediate thereof to conduct said fluid matter from said compression means and said expansion means and operating at water partial pressure greater than 3,206 psia and at temperatures greater than 705° Fahrenheit;

an oxygen, water and fuel fluid matter mixing means;

a substantially isothermal means to reject expanded fluid matter heat;

a conduit means from an oxygen source to said compression means;

a control valve interposed between said oxygen source and compression means;

a conduit means from said compression means connecting to said external reactor vessel conduit means;

a control valve interposed between said compression means and said reactor means mounted for flow control on said conduit means;

a second conduit means from said reactor means to said expansion means;

a valve means interposed between said reactor means and expansion means mounted for flow control on said conduit means;

a control means to vary a timing of said valve;

a third conduit means extending from said expansion means to said heat rejection means; and a valve means interposed between the expansion means and said last conduit mounted for flow control on said last conduit means.

11. The invention of claim 10 wherein said valve means interposed between said reactor means and said expansion means is a rotating circular valve means revolving about concentric axis regulating flow by internal passage exposure to said reactor means and said expansion means.

12. The invention of claim 10 and wherein said oxygen, water and fuel mixing means comprises a hydraulically actuated liquid atomizing nozzle means enclosed and sealed from the atmosphere by chamber means with at least one entrance port means and one exit port means.

13. The invention of claim 10 wherein said oxygen, water and fuel mixing means further comprises a gas actuated liquid atomizing nozzle means enclosed and sealed from the atmosphere by chamber means with at least one entrance port means and one exit port means.

14. The invention of claim 10 wherein said substantially isobaric reactor vessel means comprises a pressure containment means with at least one entrance port and at least one exit port.

15. The invention of claim 10 wherein said a substantially isobaric reactor vessel means comprises an elongated tubular pressure containment means with at least one entrance port and at least one exit port.

16. The invention of claim 10 wherein said substantially isobaric reactor vessel means comprises a cylindrical pressure containment vessel means encircling and complementary with at least one cylindrical reaction shield means and arranged concentric therewith and interposed between at least one circular pressure containment plate means whereby said reaction shield means butts and seals one of said containment plates and disposed concentric therewith, an exit centrally disposed through same end plate.

17. The invention of claim 10 wherein said valve timing control means times and meters said fluid matter exiting said reactor vessel.

18. The invention of claim 17 wherein said timing control means further includes a timing belt means, said timing belt means provided for driving said valve means externally between said reactor means and expansion means.

19. A heat engine comprising: a gaseous oxidant, water and substantially organic matter mixing means to provide for mixing of said matter and affording their compressive cooling;

a substantially isentropic compression means for compressing the mixed oxygen, water and organic matter;

a fluid matter conduit means connecting with said compression means and a substantially isentropic means of expanding the said fluid matter exiting said matter conduit means and arranged intermediate thereof;

a substantially isobaric means of adding heat to fluid matter in said matter conduit means external to;

a substantially isothermal means of rejecting expanded fluid matter heat; and wherein said isentropic compression means includes at least one piston and cylinder arranged for compression of at least the water, organic matter, and oxygen.

20. A heat engine comprising:

a gaseous oxidant, water and substantially organic matter mixing means to provide for mixing of said matter and affording their compressive cooling;

a substantially isentropic compression means for compressing the mixed oxygen, water and organic fluid matter;

a fluid matter conduit means connecting with said compression means and a substantially isentropic means of expanding the said fluid matter exiting said matter conduit means and arranged intermediate thereof;

a substantially isobaric means of adding heat to fluid matter in said matter conduit means; and a substantially isothermal means of rejecting expanded fluid matter heat;

wherein said isothermal means of heat rejection includes a fluid conduit means, a source of external fluid ambiently surrounding fluid conduit means and arranged for heat transfer from any steam and water generated to the external fluid; and said external fluid arranged for receiving the heat transferred from the steam and water generated by the heat engine during its operation.

* * * * *